United States Patent
Ahn et al.

(10) Patent No.: US 11,933,688 B2
(45) Date of Patent: Mar. 19, 2024

(54) PORTABLE APPARATUS FOR MEASURING MANIPULATION FORCE

(71) Applicants: Hyundai Motor Company, Seoul (KR); Kia Corporation, Seoul (KR); Dong Ho Yang, Gyeonggi-do (KR)

(72) Inventors: Sang Seo Ahn, Gyeonggi-do (KR); Jong Jun Kim, Seoul (KR); Dong Ho Yang, Gyeonggi-do (KR)

(73) Assignees: Hyundai Motor Company, Seoul (KR); Kia Corporation, Seoul (KR); Dong Ho Yang, Gyeonggi-do (KR)

( * ) Notice: Subject to any disclaimer, the term of this patent is extended or adjusted under 35 U.S.C. 154(b) by 2 days.

(21) Appl. No.: 17/880,275

(22) Filed: Aug. 3, 2022

(65) Prior Publication Data

US 2023/0184607 A1    Jun. 15, 2023

(30) Foreign Application Priority Data

Dec. 15, 2021   (KR) .......................... 10-2021-0180059

(51) Int. Cl.
*G01L 5/00*    (2006.01)

(52) U.S. Cl.
CPC .................................. *G01L 5/0042* (2013.01)

(58) Field of Classification Search
CPC ....... G01L 5/0042; G01L 5/0028; G01L 5/22; G01L 1/22
See application file for complete search history.

(56) References Cited

U.S. PATENT DOCUMENTS

| | | | | |
|---|---|---|---|---|
| 3,602,043 A | * | 8/1971 | Markey | G01L 5/28 73/132 |
| 5,363,027 A | * | 11/1994 | Noguchi | G09B 9/04 73/115.04 |
| 5,372,035 A | * | 12/1994 | Ogawa | G01M 17/0074 73/115.03 |
| 5,627,767 A | * | 5/1997 | Gabiniewicz | G01L 5/22 702/41 |
| 5,666,138 A | * | 9/1997 | Culver | G06F 3/0362 345/157 |
| 6,141,603 A | * | 10/2000 | Greenhill | G01M 17/0074 318/587 |
| 6,618,037 B2 | * | 9/2003 | Sakamaki | G06F 3/0338 345/158 |
| 7,465,890 B2 | * | 12/2008 | Yamasaki | G06F 3/0362 200/11 R |
| 7,628,239 B1 | * | 12/2009 | Louie | B62D 1/00 701/2 |
| 9,188,507 B2 | * | 11/2015 | Schulte | G01M 17/06 |
| 11,440,404 B2 | * | 9/2022 | Kodama | B60K 26/02 |
| 11,448,569 B2 | * | 9/2022 | Kodama | G01M 17/0074 |
| 11,453,116 B2 | * | 9/2022 | Kodama | B25J 9/0009 |
| 11,453,350 B2 | * | 9/2022 | Kodama | G01M 17/0072 |

(Continued)

*Primary Examiner* — Freddie Kirkland, III
(74) *Attorney, Agent, or Firm* — Fox Rothschild LLP

(57) ABSTRACT

Provided is a portable apparatus for measuring a manipulation force. The apparatus includes a manipulation force measurement unit configured to measure a manipulation force applied on a manipulated part in a first direction of pushing forward or pulling backward and measure a manipulation force in a second direction of moving toward left or right, and a controller configured to process the measured manipulation force to generate manipulation force information over time.

18 Claims, 11 Drawing Sheets

(56) References Cited

U.S. PATENT DOCUMENTS

| | | | |
|---|---|---|---|
| 11,467,064 B2* | 10/2022 | Kodama | G01M 17/007 |
| 11,474,002 B2* | 10/2022 | Kodama | G01M 17/007 |
| 2006/0054479 A1* | 3/2006 | Iisaka | H01H 21/24 |
| | | | 200/61.57 |
| 2007/0089534 A1* | 4/2007 | Chang | G01M 13/025 |
| | | | 73/862.08 |
| 2009/0030621 A1* | 1/2009 | Ahn | G01L 5/22 |
| | | | 702/41 |
| 2021/0287862 A1* | 9/2021 | Tomiyama | H01H 21/40 |
| 2022/0090986 A1* | 3/2022 | Kodama | G01M 17/06 |

* cited by examiner

PORTABLE APPARATUS FOR MEASURING MANIPULATION FORCE

CROSS-REFERENCE TO RELATED APPLICATION

This application is based on and claims the benefit of Korean Patent Application No. 10-2021-0180059 filed in the Korean Intellectual Property Office on Dec. 15, 2021, the entire contents of which are incorporated herein by reference.

TECHNICAL FIELD

Embodiments of the present disclosure relate to a portable apparatus for measuring a manipulation force of a manipulated part. More particularly, embodiments of the present disclosure relate to a portable apparatus for measuring a manipulation force of a manipulated part for measuring a manipulation force of various manipulated parts applied in an interior space of a vehicle.

DESCRIPTION OF THE RELATED ART

In general, a force (hereinafter, called a manipulation force) required for pushing forward or pulling backward an object may be measured by a push pull gauge. Such a measurement is necessary in the development state of a product, for enabling stable production without an excessive variation in the manipulation force.

For example, the interior space of the vehicle assembled in the factory is provided with manipulated parts operated in various methods according to the manipulation of a user, such as a button-type manipulator, an inner handle of a door, an air vent for adjusting the air blow direction when cooling or heating, a window switch, and a rotation-type dial knob such as an integrated manipulator of a shift-by-wire (SBW) transmission.

These manipulated parts are typically configured to give a feeling of being caught in each manipulation step during the manipulation, to prevent distraction of the user, transfer manipulation feeling, and provide easiness in adjusting control force. At this time, the manipulation force of the manipulated part is tuned such that the user may not feel excessive stiffness, looseness, or the like. That is, the manipulated parts are required to be appropriately tuned during the development stage.

Conventionally, in the development of the vehicle, the manipulation force required for manipulating the manipulated parts are measured by the push pull gauge and turned.

However, a typical conventional push pull gauge is capable of measuring only a single direction of moving forward and backward and may not provide a multi-directional measurement including other directions, for example, a horizontal direction.

In addition, when the push pull gauge may not be positioned in an appropriate direction, for example, due to geometrical interference between surrounding component parts and the manipulated part of the measurement target, the measurement may be difficult, and the measured value may become inaccurate.

In addition, in order to optimize the tuning of the manipulated part, obtaining quantitative data of the change in the manipulation force during a preset operation time is required. However, the conventional push pull gauge may only measure the maximum peak value of the manipulation force thereby not being capable of sufficiently quantifying the manipulation force.

In this case, for tuning the manipulation force, modification of the mold may be repeated according to emotional motivation of the evaluator, which increases development period and cost.

SUMMARY

Embodiments of the present disclosure provide a portable apparatus for measuring a manipulation force capable of measuring the manipulation force in a plurality of directions of a manipulated part applied to a vehicle.

A portable apparatus for measuring a manipulation force includes a manipulation force measurement unit configured to measure a manipulation force applied on a manipulated part in a first direction of pushing forward or pulling backward and measure a manipulation force in a second direction of moving toward left or right, and a controller configured to process the measured manipulation force to generate manipulation force information over time.

The controller may be configured in a measurement apparatus main body. The measurement apparatus main body may be configured to selectively mount at least one of a first manipulation force measuring device configured to measure the manipulation force in the first direction and a second manipulation force measuring device configured to measure the manipulation force in the second direction.

The first manipulation force measuring device may include a first load cell configured to measure a force transferred in the first direction when pushing forward or pulling backward the manipulated part by a first measuring tip coupled to an end of a first rod, a first connector having a multi-pin structure and configured to be electrically connected to a connector terminal configured in a mounting portion when mounted to the measurement apparatus main body, and a first adapter housing configured to install the first road cell and the first connector, and being separable into upper and lower housings.

The first load cell may be configured to measure the force directly transferred through the first rod and transmit a manipulation force signal corresponding to a measured force to the controller through the first connector.

The first adapter housing may include a first insertion groove configured to receive a shaft of a fastening bolt configured on the mounting portion when mounted on the measurement apparatus main body.

The first measuring tip may be replaceably mounted on the end of the first rod in accordance with a shape and an operation method of the manipulated part and may be formed in at least one form of a hook shape, a concave triangular shape, a convex triangular shape, a conical shape, and a flat head nail shape.

The second manipulation force measuring device may include a second load cell configured to measure force transferred in the second direction when moving the manipulated part to the left or right by a second measuring tip engaged to an end of a linkage portion perpendicularly connected to a second rod, a second connector having a multi-pin structure and configured to be electrically connected to a connector terminal configured in a mounting portion when mounted to the measurement apparatus main body, and a second adapter housing configured to install the second road cell and the second connector, and being separable into upper and lower housings.

The second load cell may be installed in the second adapter housing in a direction perpendicular to the second measuring tip.

The linkage portion may include a pin joint perpendicularly connected to the second rod, a measurement shaft configured to mount the second measuring tip, and a hinge block configured to connect the pin joint and the measurement shaft through a hinge structure.

The pin joint may be connected to the second rod through a ball joint bearing.

The second measuring tip may form a concave groove for positioning the manipulated part when measuring the manipulation force in the second direction.

The portable apparatus may further include a gripper configured to grip an exterior circumference of a rotation-type the manipulated part, where the controller may be configured to measure the manipulation torque of the rotation-type the manipulated part in a rotating direction.

The gripper may include an adjuster configured to adjust a force for gripping a rotation-type manipulated part, a threaded shaft coupled to a lower portion of the adjuster, a base frame configured to support the lower portion of the threaded shaft, a tong portion formed in a link structure and disposed on a circumference of the base frame, a grip tip formed at an end of the tong portion, and a measurement bar horizontally extending from the base frame.

The controller may be configured to calculate a rotation manipulation torque by multiplying a radius of the rotation-type the manipulated part to a force of pushing the measurement bar and process the calculated torque to generate manipulation torque information over time.

The portable apparatus may further include a measurement apparatus main body that may include a signal processor configured to convert an analog manipulation torque signal received from the manipulation force measurement unit to a digital signal, a storage configured to store a change in the manipulation torque collected by measurement for the manipulated part and a corresponding graph, an input portion configured to be operated by a user for the manipulation torque measurement a power unit including a battery capable of charging and discharging and configured to supply an electrical power, and a display configured to display various menu for setting user environment and measurement conditions, and the controller. The controller may be configured to operate the manipulation force measurement unit during a preset period according to an input from the input portion, measure the change in the manipulation torque while manipulating the manipulated part, and visually display a corresponding graph over time through the display.

The measurement apparatus main body may include a mounting portion capable of mounting the manipulation force measurement unit and electrically connected to the mounted manipulation force measurement unit through a connector terminal, and a fastening bolt screw-engaged with a side surface of a main body housing of the measurement apparatus main body and configured to apply a fastening force to a side surface of the mounted manipulation force measurement unit toward the main body housing.

The portable apparatus may further include a measurement apparatus main body that may include a signal processor configured to convert an analog manipulation force signal received from the manipulation force measurement unit to a digital signal, a storage configured to store a change in the manipulation force collected by measurement for the manipulated part, an input portion configured to be operated by a user for the manipulation force measurement, a power unit configured to supply an electrical power, and a display configured to display a menu for setting user environment and measurement conditions, and the controller. The controller may be configured to operate the manipulation force measurement unit during a preset period according to an input from the input portion, measure the change in the manipulation force while manipulating the manipulated part, and visually display a corresponding graph over time through the display.

The measurement apparatus main body may further include a communication unit configured to connected to a user terminal through wired or wireless communication to communicate the data stored in the storage.

The controller may be configured to calculate the change in the manipulation force over time under operation of the manipulated part based on the manipulation force signal processed at the signal processor and generate the graph for the time-dependent change.

The controller may be configured to generate time-dependent numerical data corresponding to the graph and display the generated data together with the graph through the display.

According to an exemplary embodiment, a portable apparatus for measuring a manipulation force is realized in a scheme replacing multi-function adapters to one measurement apparatus main body, and therefore, the apparatus becomes more portable, and capable of measuring the manipulation force of various manipulated parts in the second direction and the rotating direction as well as the back-and-forth direction.

The change in the manipulation force over time is obtained and displayed during the manipulation of the manipulated part, and quantitative comparison on the manipulated force may be enabled on the manipulation force data.

In addition, adapters with variously shaped tips appropriate for the manipulation directions and shapes of the manipulated component parts may be replaceably used, and thereby the accuracy in measuring the manipulation force may be improved, thereby reducing the time and cost for tuning the manipulation force.

As discussed, the method and system suitably include use of a controller or processer.

In another aspect, vehicles are provided that comprise an apparatus as disclosed herein.

DETAILED DESCRIPTION OF THE EMBODIMENTS

Figure 1:
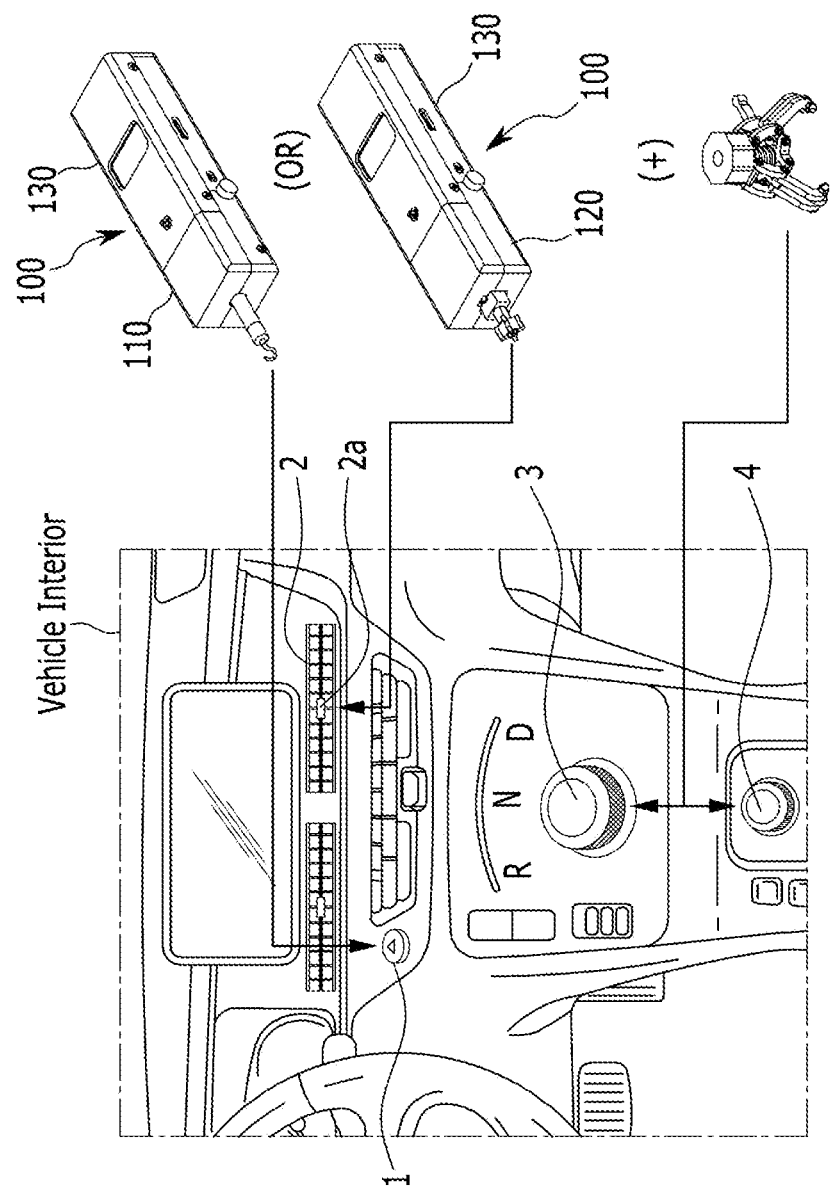
FIG. 1 is a schematic view of an interior of a vehicle for explaining a portable apparatus for measuring a manipulation force according to an exemplary embodiment.

The present disclosure will be described more fully hereinafter with reference to the accompanying drawings, in which exemplary embodiments of the present disclosure are shown.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like.

Throughout the specification, terms such as first, second, "A", "B", "(a)", "(b)", and the like will be used only to describe various elements and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

Additionally, it is understood that one or more of the below methods, or embodiments thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operations of units, modules, component parts, devices, or other similar components described below. Moreover, it is understood that the below methods may be executed by an apparatus comprising the controller in conjunction with one or more other components, as would be appreciated by a person of ordinary skill in the art.

Furthermore, the controller of embodiments of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices.

Hereinafter, a portable apparatus for measuring a manipulation force according to an exemplary embodiment is described in detail with reference to the drawings.

FIG. 1 is a schematic view of an interior of a vehicle for explaining a portable apparatus for measuring a manipulation force according to an exemplary embodiment.

Figure 2:
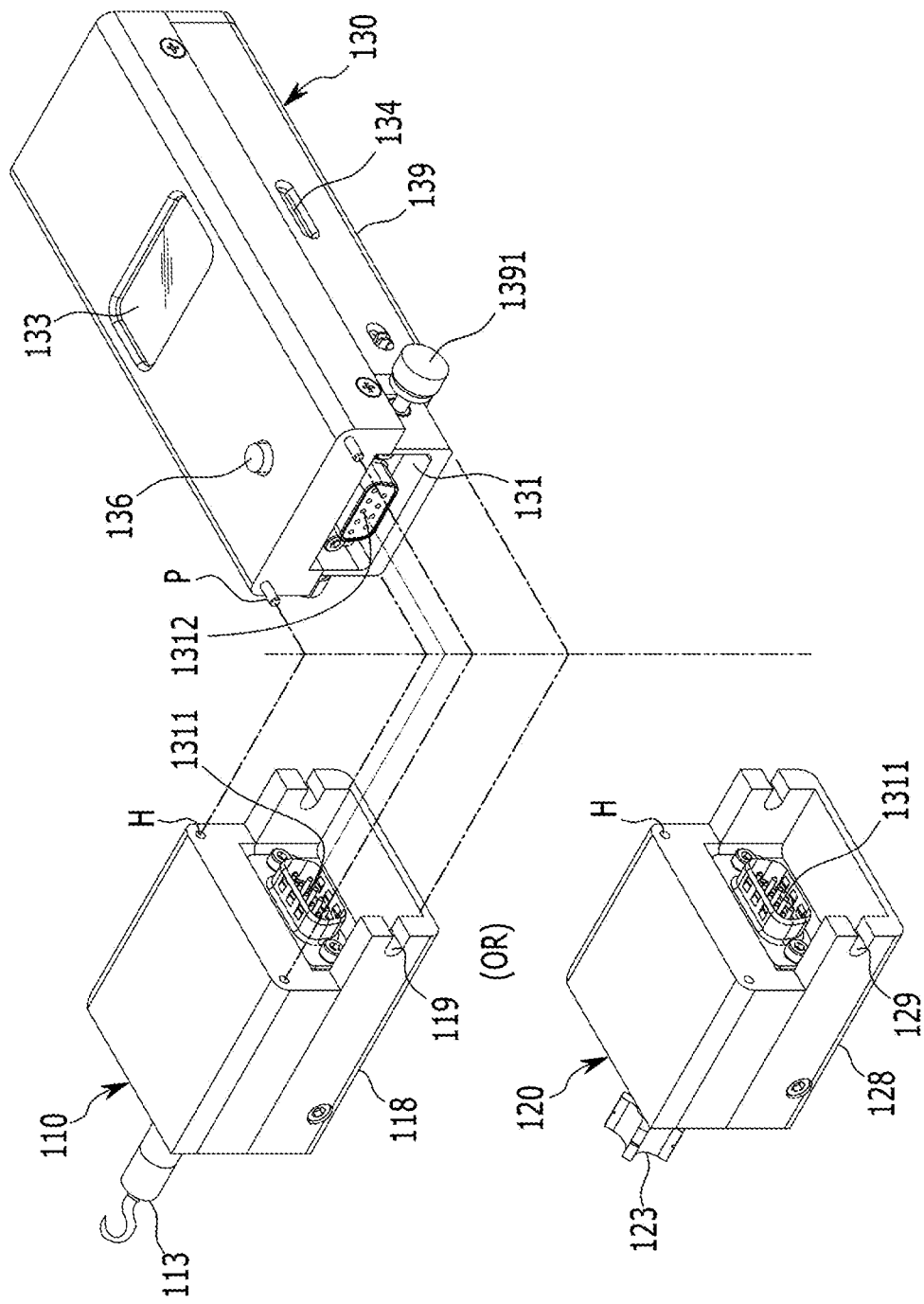
FIG. 2 illustrates a configuration of a portable apparatus for measuring a manipulation force according to an exemplary embodiment.

FIG. 2 illustrates a configuration of a portable apparatus for measuring a manipulation force according to an exemplary embodiment.

Referring to FIG. 1 and FIG. 2, the interior space of the vehicle assembled in the factory may be provided with manipulated parts operated in various methods, for example, a push button 1 for activating a function, a slim-type air vent 2 provided with a wing adjuster 2a for adjusting the air blow direction, a rotation-type dial knob 3 of an SBW transmission, and a rotation-type dial knob 4 of a multi-function integrated manipulator.

However, as described in the background section, a conventional push pull gauge may only measure the manipulation force in a first direction (e.g., a back and forth direction), not being capable of measuring the manipulation force in a second direction (e.g., a direction perpendicular to the back and forth direction) and may only measure the maximum peak value of the manipulation force thereby not being capable of sufficiently quantifying the manipulation force.

In addition, when the push pull gauge may not be positioned in an appropriate direction, for example, due to geometrical interference between surrounding component parts and the manipulated part of the measurement target, the measurement may be difficult, and the measured value may become inaccurate.

For example, in the case of an air vent manipulated in the second direction of moving left and right, the manipulation force may be attempted to be measured by altering the angle of the push pull gauge in the work field, however, this may be difficult due to geometrical interference with surrounding component parts, thereby resulting an inaccurate value. Here, since the appearance of the air vent 2 is becoming to be slim in recently produced vehicles due to the enlargement of the display such as a navigation system, precise measurement becomes difficult, and so a method for precisely measuring the manipulation force in the second direction is advantageous A portable apparatus 100 for measuring a manipulation force according to an exemplary embodiment may include a manipulation force measurement unit configured to measure a manipulation force in the first direction of pushing forward or pulling backward or measure a manipulation force in the second direction of moving toward left or right, and a controller 138 configured to process the measured manipulation force to generate manipulation force information over time.

The manipulation force measurement unit may include a first manipulation force measuring device 110 configured to measure a manipulation force in the first direction and a second manipulation force measuring device 120 configured to measure a manipulation force in the second direction.

The control unit 138 may be configured in a measurement apparatus main body 130. The measurement apparatus main body 130 may be configured to, depending on depending on manipulation direction of the manipulated part, selectively mount at least one of the first manipulation force measuring device 110 and the second manipulation force measuring device 120, in an adapter scheme. The control unit 138 may be configured to obtain a change in the manipulation force of the manipulated part over time through the manipulation force measurement unit, and visually display a graph of the change through a display.

Here, the first direction and the second direction may mean a moving direction of the portable apparatus 100 for measuring a manipulation force in order to measure the manipulation force on the manipulated part. For example, the manipulated part is intended to be manipulated in all directions, the first direction may mean a back and forth operation direction of the manipulated part, and the second direction may mean a left-and-right operation direction of the manipulated part.

That is, the portable apparatus 100 for measuring a manipulation force of a manipulated part may be used by selectively mounting the first manipulation force measuring device 110 and/or the second manipulation force measuring device 120 to the one measurement apparatus main body 130, depending on the type or the operation method of the manipulated part.

For example, the portable apparatus 100 for measuring a manipulation force mounted with the first manipulation force measuring device 110 may measure the change in the manipulation force according to an operation method of pushing forward or pulling backward, such as the push button 1 in the vehicle interior or an inner handle of a door (not shown).

In addition, the second manipulation force measuring device 120 may measure the change in the manipulation force according to an operation method of sliding left and right, such as a wing node 2a of the air vent 2.

Figure 6:
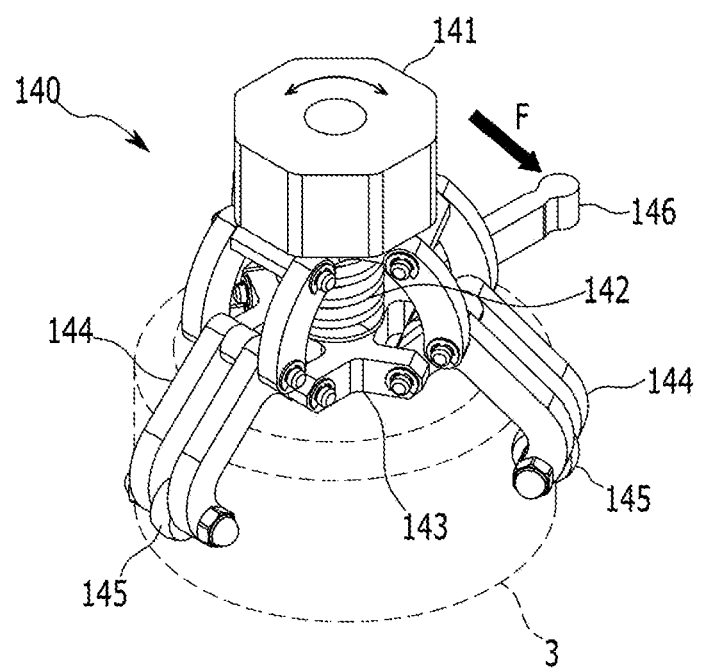
FIG. 6 and FIG. 7 illustrate a gripper used to measure a manipulation force in a rotating direction according to an exemplary embodiment.
Figure 7:
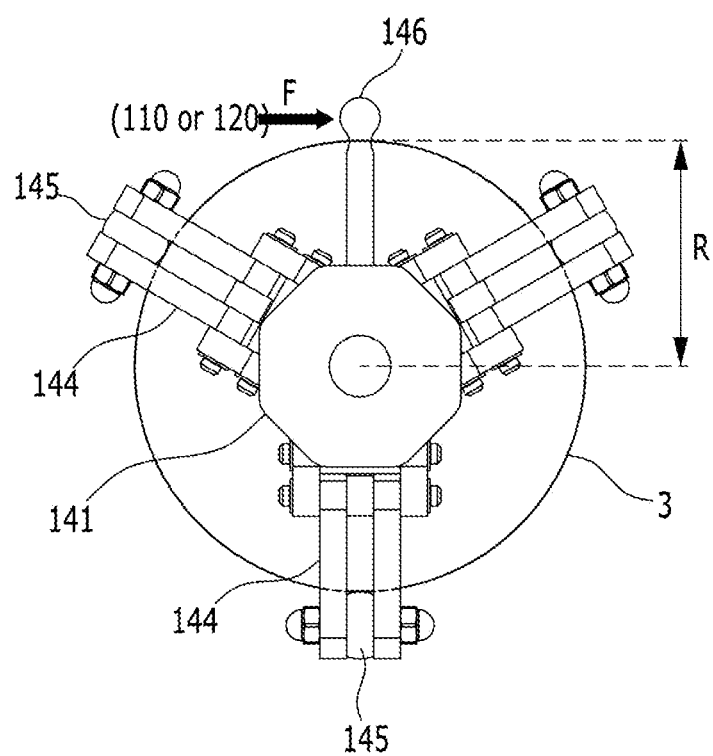

In addition, the dial knobs 3 and 4 may be gripped by a gripper 140 provided as a separate object, and by applying a force F to a measurement bar 146 connected thereto by using the first manipulation force measuring device 110 or the second manipulation force measuring device 120, the change in the manipulation force according to a rotating operation method may be measure (refer to FIG. 6 and FIG. 7).

The portable apparatus 100 for measuring a manipulation force may be configured to obtain a graph of the change in the manipulation force over time during the manipulation of the manipulated part, measure the force in the second direction and the force in the rotating direction as well as the force in the first direction, and avoid an interference with surrounding component parts during the measurement of the manipulation force, which is advantageous over the conventional push pull gauge.

The portable apparatus 100 for measuring a manipulation force in a multi-function measurement method is described in more detail with reference to the drawings.

Figure 3:
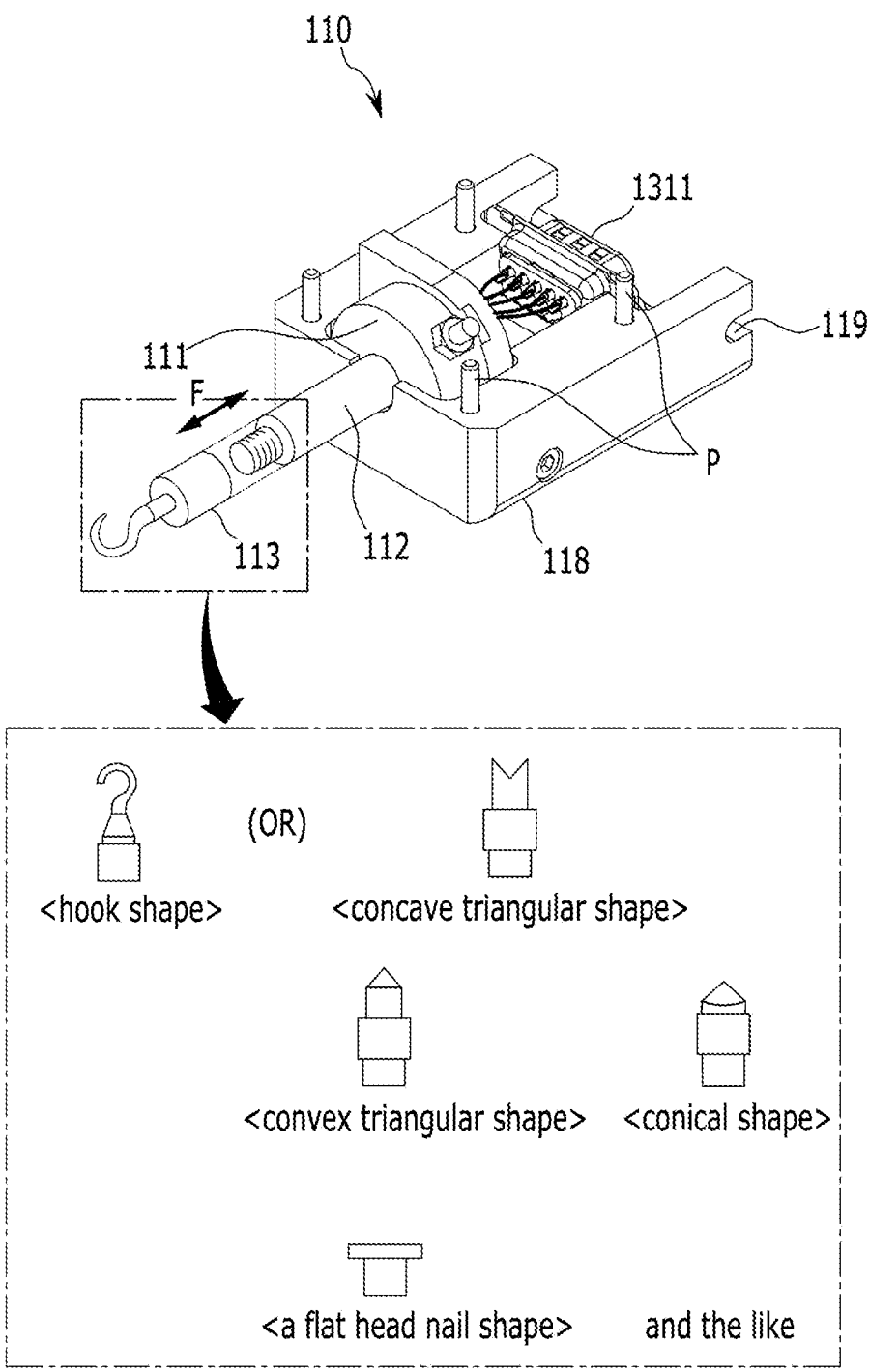
FIG. 3 illustrates a configuration of a first manipulation force measuring device configured to measure a manipulation force in a first direction according to a first exemplary embodiment.

FIG. 3 illustrates a configuration of a first manipulation force measuring device configured to measure a manipulation force in the first direction according to a first exemplary embodiment.

Referring to FIG. 3, the first manipulation force measuring device 110 according to an exemplary embodiment may be mounted on a mounting portion 131 of the measurement apparatus main body 130, and includes a first load cell 111, a first rod 112, a first measuring tip 113, a connector 1311, and a first adapter housing 118.

The first load cell 111 may be a sensor that measures the force F transferred in the first direction when pushing forward or pulling backward the manipulated part with the first measuring tip 113 coupled to an end of the first rod 112.

At this time, when measuring the manipulation force of the manipulated part, the first load cell 111 may be configured to measure the force directly transferred through the first rod 112 and transmit a manipulation force signal corresponding to the measured force to the measurement apparatus main body 130 through the connector 1311.

The first measuring tip 113 is a contact tool to manipulate a measurement target of the manipulated part and may be screw-engaged to the end of the first rod 112 to be replaceable.

For example, the first measuring tip 113 may be replaceably mounted on the end of the first rod 112 in accordance with a shape and an operation method of the manipulated part and may be formed in at least one form of a hook shape, a concave triangular shape, a convex triangular shape, a conical shape, and a flat head nail shape. It may be understood that the types of the first measuring tip 113 is not limited to the above list and may be formed as required.

The connector 1311 may have a multi-pin structure and be configured to be electrically connected to a connector terminal 1312 configured in the mounting portion 131 when mounted to the measurement apparatus main body 130.

That is, the first manipulation force measuring device 110 may receive electrical power from the measurement apparatus main body 130 through the connector 1311 connected to the connector terminal 1312, and in response to a signal, transmit the manipulation force signal measured at the first load cell 111 to the measurement apparatus main body 130.

The first adapter housing 118 may be configured to install the first load cell 111 and the connector 1311, and be separable into an upper portion and a lower portion, and may be assembled by a plurality of assembling pins P and a plurality of assembling holes H.

The first adapter housing 118 may include a first insertion groove 119 configured to receive a shaft of a fastening bolt 1391 configured on the mounting portion 131 when mounted on the measurement apparatus main body 130.

When the first adapter housing 118 is assembled with the measurement apparatus main body 130, the first insertion groove 119 may receive the shaft of the fastening bolt 1391 such that side surface of the first adapter housing 118 may tight contact the measurement apparatus main body 130 by the fastening force of the fastening bolt 1391.

Figure 4:
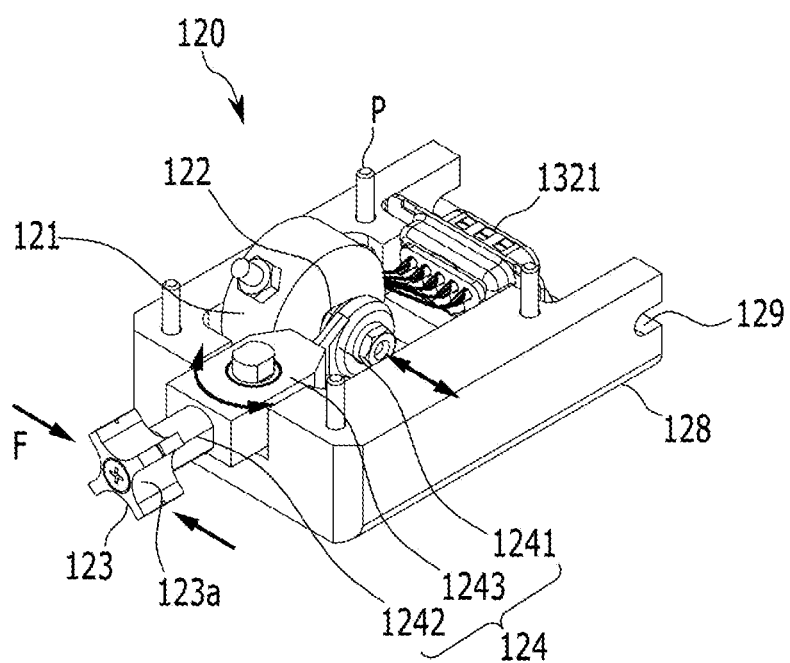
FIG. 4 and FIG. 5 illustrate a configuration of a second manipulation force measuring device configured to measure a manipulation force in a second direction according to an exemplary embodiment.
Figure 5:
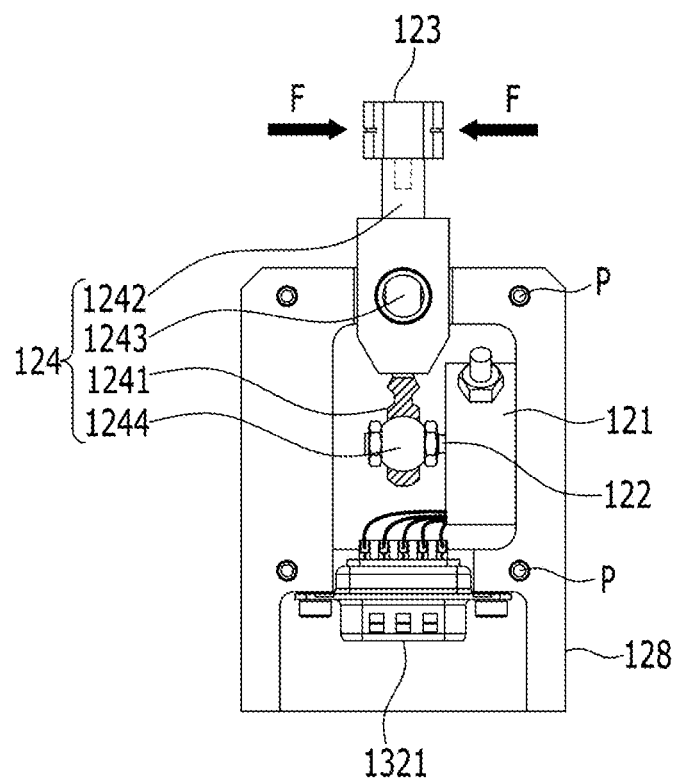

FIG. 4 and FIG. 5 illustrate a configuration of a second manipulation force measuring device configured to measure a manipulation force in the second direction according to an exemplary embodiment.

Referring to FIG. 4 and FIG. 5, the second manipulation force measuring device 120 according to an exemplary embodiment may be mounted on the mounting portion 131 of the measurement apparatus main body 130, and include a second load cell 121, a second rod 122, a second measuring tip 123, a linkage portion 124, the connector 1311, and a second adapter housing 128.

The following description for the second manipulation force measuring device 120 is more focused on differences from the first manipulation force measuring device 110 in connection with the feature of measure a manipulation force in the second direction rather than the first direction, without a redundant description of the same features.

The second load cell 121 may be a sensor configured to measure the force F transferred in the second direction when moving the manipulated part to the left or right by the second measuring tip 123 engaged to an end of the linkage portion 124 perpendicularly connected to the second rod 122.

In order to measure a manipulation force in the second direction, the second load cell 121 may be installed in the second adapter housing 128 in the direction perpendicular to the second measuring tip 123, which is different from the first manipulation force measuring device 110. The second load cell 121 may provide a measurement function in stretching and compressive directions and may be configured to measure the force F applied in the second direction (i.e., in left-and-right direction) by using the second measuring tip 123.

The linkage portion 124 may be positioned between the second measuring tip 123 and the second rod 122 and be configured to transfer the force applied on the second measuring tip 123 to the second rod 122 when measuring the manipulation force of the manipulated part in the second direction.

The linkage portion 124 may include a pin joint 1241 perpendicularly connected to the second rod 122, a measurement shaft 1242 configured to mount the second measuring tip 123, and a hinge block 1243 configured to connect the pin joint 1241 and the measurement shaft 1242 through a hinge structure.

Here, when the force F is applied to the second measuring tip 123, the linkage portion 124 may form a rotative torque around the hinge block 1243, and a force of distortion may be applied to on the pin joint 1241.

Therefore, in order to prevent such a force of distortion from occurring on the pin joint 1241, the pin joint 1241 may be connected to the second rod 122 through a ball joint bearing 1244, and thereby the pin joint 1241 may be free of distortion.

The second measuring tip 123 may form a concave groove 123a for positioning the manipulated part (e.g., a knob thereof) when measuring the manipulation force in the second direction.

For example, the second measuring tip 123 may be formed in an X-shape having the concave groove 123a at four sides, and by positioning the second measuring tip 123 to the wing adjuster 2a of the slim-type air vent 2 shown in FIG. 1 when measuring the manipulation force in the second direction, the wing adjuster 2a may be prevented from escaping from the concave groove 123a.

The second adapter housing 128 may include a second insertion groove 129 configured to receive a shaft of the fastening bolt 1391 configured on the mounting portion 131 when mounted on the measurement apparatus main body 130.

When the second adapter housing 128 is assembled with the measurement apparatus main body 130, the second insertion groove 129 may receive the shaft of the fastening bolt 1391 such that side surface of the second adapter housing 128 may tight contact the measurement apparatus main body 130 by the fastening force of the fastening bolt 1391.

FIG. 6 and FIG. 7 illustrate a gripper used to measure a manipulation force in a rotating direction according to an exemplary embodiment.

The gripper 140 according to an exemplary embodiment may be provided as a separate object to be used to catch a rotation-type manipulated part when measuring the manipulation force (e.g., torque).

For example, the gripper 140 may grip a rotation-type manipulated part such as the dial knob 3 of an SBW transmission, and by applying a force to the measurement bar 146 horizontally connected to the gripper 140 by using the first manipulation force measuring device 110 or the second manipulation force measuring device 120, the manipulation force in the rotating direction may be measured.

Hereinafter, the following description for the gripper 140 may be more focused on differences from the manipulation force measuring devices 110 and 120 in connection with the feature of measure a manipulation force in the first and second directions, without a redundant description of the same features.

Referring to FIG. 6 and FIG. 7, the gripper 140 according to an exemplary embodiment may include an adjuster 141 configured to adjust (tighten or loosen) a force for gripping a rotation-type manipulated part (for example, the dial knob 3), a threaded shaft 142 coupled to lower portion of the adjuster 141, a base frame 143 configured to support lower portion of the threaded shaft 142, a plurality of tong portions 144 each formed in a link structure and disposed along a circumference of the base frame 143, a grip tip 145 formed at an end of the tong portion 144, and the measurement bar 146 horizontally extending from the base frame 143.

When the adjuster 141 is rotated to one direction, the base frame 143 of the gripper 140 may be raised along the threaded shaft 142, and thereby the grip tips 145 of the tong portions 144 may be tightened to firmly hold the rotation-type dial knob 3. The grip tip 145 may be made of an elastic rubber or silicone material to firmly grip the dial knob 3 without damage.

In addition, as shown in FIG. 7, the measurement bar 146 of the gripper 140 holding the dial knob 3 may be pushed by the first manipulation force measuring device 110 or the second manipulation force measuring device 120 in the rotating direction, and thereby the rotation manipulation force may be measured.

At this time, the load cell 111 or 112 of the first manipulation force measuring device 110 or the second manipulation force measuring device 120 may measure the rotation manipulation force of the dial knob 3 in a left-and-right rotating direction and transmit the measured rotation manipulation force to the measurement apparatus main body 130.

In addition, the measurement apparatus main body 130 may calculate a rotation manipulation torque by multiplying a radius R of the dial knob 3 to the force F of pushing the measurement bar 146 and may process the calculated torque to generate manipulation torque information over time, e.g., generate a graph during the operation period.

Figure 8:
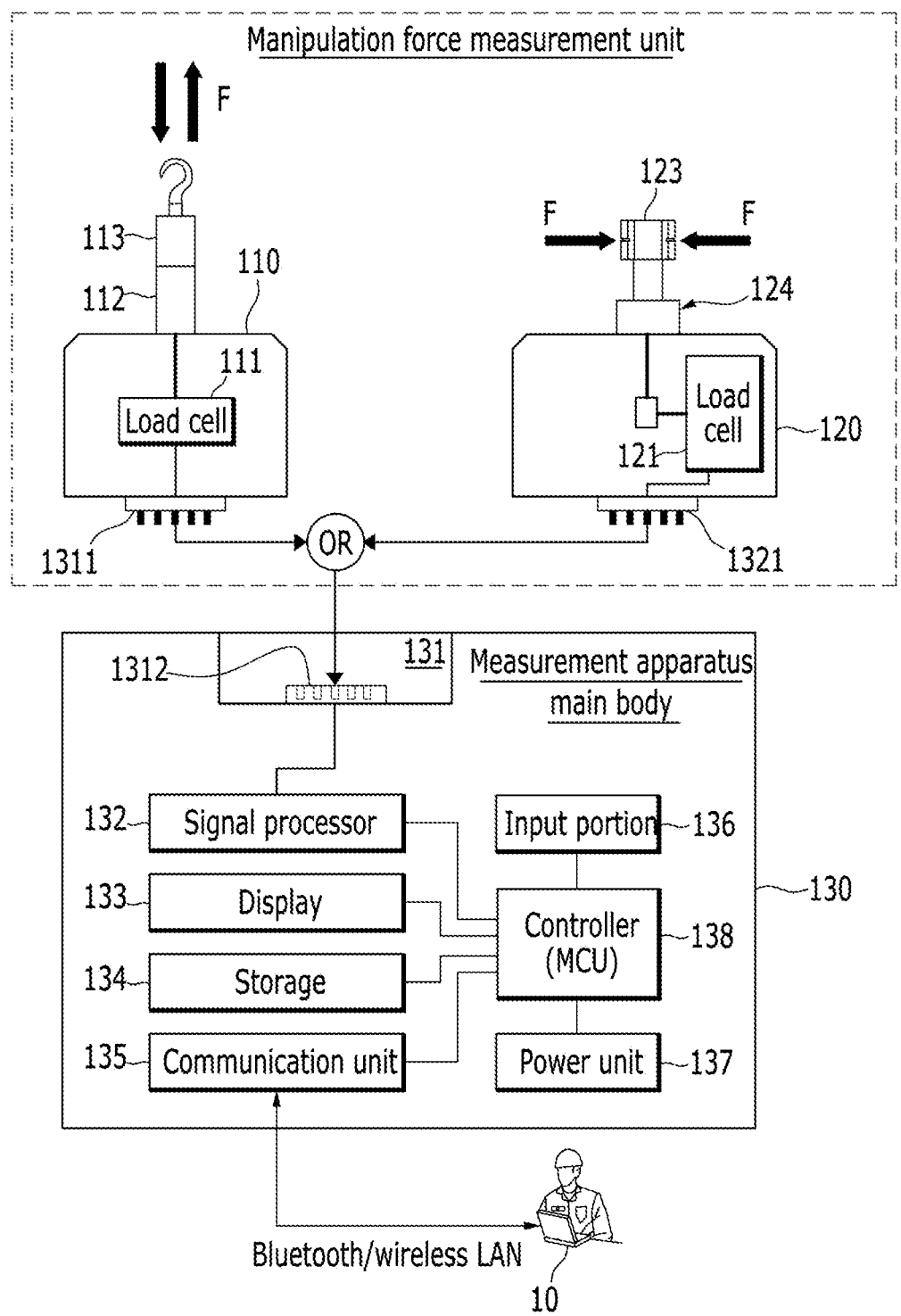
FIG. 8 is a block diagram that illustrates a control configuration according to an exemplary embodiment.

Here, the measurement apparatus main body 130 may include a signal processor 132 configured to convert an analog manipulation torque signal received through connector of the manipulation force measurement unit to a digital signal, a storage 134 configured to store a change in the manipulation torque collected by measurement for the manipulated part and a corresponding graph, an input portion 136 configured to be operated by a user for the measurement of the manipulation torque and/or the manipulation force, a power unit 137 including a battery capable of charging and discharging and configured to supply an electrical power, a display 133 configured to display various menu for setting user environment and measurement conditions, and the controller 138 (refer to FIG. 8). The controller 138 may be configured to operate the manipulation force measurement unit during a preset period according to an input from the input portion, measure the change in the manipulation torque while manipulating the manipulated part, and visually display a corresponding graph over time through the display.

Thereafter, when the adjuster 141 may be rotated to an opposite direction, the base frame 143 of the gripper 140 is lowered along the threaded shaft 142, and thereby the grip tips 145 of the tong portions 144 may be loosened to release the rotation-type dial knob 3.

Meanwhile, FIG. 8 is a block diagram that illustrates a control configuration according to an exemplary embodiment.

Referring to FIG. 2 and FIG. 8, the measurement apparatus main body 130 according to an exemplary embodiment may include the mounting portion 131, the signal processor 132, the display 133, the storage 134, a communication unit 135, the input portion 136, the power unit 137, the controller (e.g., a micro controller unit, MCU) 138, and a main body housing 139.

As described above, the main body housing 139 may be separable into the upper portion and the lower portion, and provide a coupling structure of a plurality of assembling pins P and a plurality of assembling holes H. In addition, the main body housing 139 may be coupled with the fastening bolt 1391 on at least one side surface (refer to FIG. 2). In addition, the main body housing 139 may be replaceably mounted with an adapter through a plurality of assembling pins P and a plurality of assembling holes H.

The mounting portion 131 may form an open side of the main body housing 139 and be capable of replaceably mounting the first manipulation force measuring device 110 or the second manipulation force measuring device 120 by sliding. The mounting portion 131 may be electrically connected to the mounted first manipulation force measuring device 110 or the second manipulation force measuring device 120 through the connector terminal 1312.

The fastening bolt 1391 may be screw-engaged with a side surface of the main body housing 139 and be configured to apply a fastening force to a side surface of the mounted manipulation force measurement unit (i.e., the first manipulation force measuring device 110 or the second manipulation force measuring device 120) toward the main body housing 139, to form a tight contact therebetween.

The signal processor 132 may be configured to convert the analog manipulation force signal received through the connector terminal 1312 into a digital signal. The signal processor 132 may include a semiconductor chip and/or circuit for removing noise of the manipulation force signal and amplifying the manipulation force signal.

The storage 134 may be configured to store various programs and data for operation of the portable apparatus 100 for measuring a manipulation force and store a graph of the change in the manipulation force collected by measurement on the manipulated part.

The storage unit 134 may include, e.g., a secure digital (SD) card to be detachably mounted in a slot of the main body housing 139.

The communication unit 135 may be connected to a user terminal 10 through wired or wireless communication to communicate the data stored in the storage 134. The user terminal 10 may be, for example, a tablet PC, a laptop, a smart phone, and the like, and may be connected through, for example, Bluetooth, wireless LAN, a communication cable, and the like.

The input portion 136 may include at least one button to be used by a user for operation of the manipulation force measurement. A starting time and a finish time of the manipulation force measurement of the portable apparatus 100 for measuring a manipulation force may be input by the input portion 136.

The power unit 137 may include a battery capable of charging and discharging (e.g., a secondary battery), and supply an electrical power to various loads configured in the manipulation force measurement apparatus 100. The power unit 137 may supply the electrical power for operation of the load cells 111 and 121 through the connector terminal 1312.

The controller 138 may be configured to control an overall operation of the portable apparatus 100 for measuring a manipulation force according to an exemplary embodiment and includes at least one processor for such a purpose.

The controller 138 may be configured to operate the measurement adapter 110 or 120 during a preset period according to an input from the input portion 136, and continuously collect the measured manipulation force while manipulating the manipulated part.

At this time, the controller 138 may collect the manipulation force in the first direction when mounted with the first manipulation force measuring device 110 and collect the manipulation force in the second direction or the rotating direction when mounted with the second manipulation force measuring device 120.

The controller 138 may be configured to calculate the change in the manipulation force over time under operation of the manipulated part based on the manipulation force signal processed at the signal processor 132 and generate the graph for visualizing the time-dependent change.

The controller 138 may be configured to generate time-dependent numerical data corresponding to the graph and display the generated data through the display 133 together with the graph.

Depending on the manipulated part, the controller 138 may be configured to accumulatively store the measured data obtained in a plurality of measurement count in the storage 134, derive a result of a quantitative comparison on the manipulation forces over measurement count and operation time, and display a graph of the derived result through the display 133. At this time, the controller 138 may derive an average value and deviation values for the graphs measure by a plural manipulation count and provide the derived values to the user.

In addition, the controller 138 may send raw data and the analyzed graph data of the manipulation force collected through the measurement history on each manipulated part, to the user terminal 10 through the communication unit 135, e.g., for later precise analysis.

The display 133 may be configured to visually display various information according to the operation of the portable apparatus 100 for measuring a manipulation force, and may be formed as, for example, a liquid crystal display (LCD), a touchscreen, and the like.

The display 133 may be configured to visually display the graph of the change in the manipulation force for the manipulated part and display various menus for setting user environment and measurement conditions.

Figure 9:
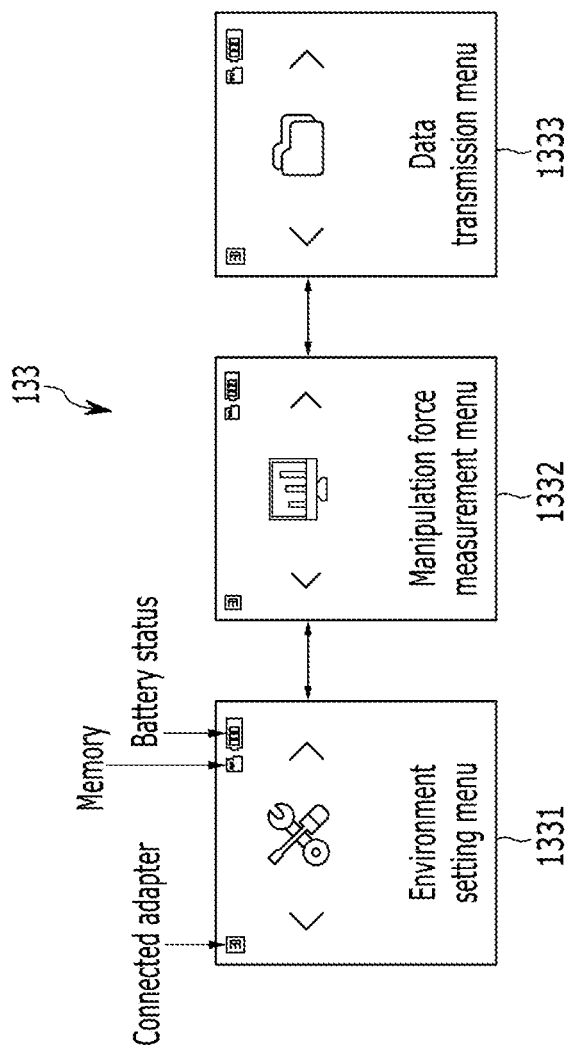
FIG. 9 to FIG. 11 illustrate menu screens displayed on a display according to an exemplary embodiment.
Figure 10:
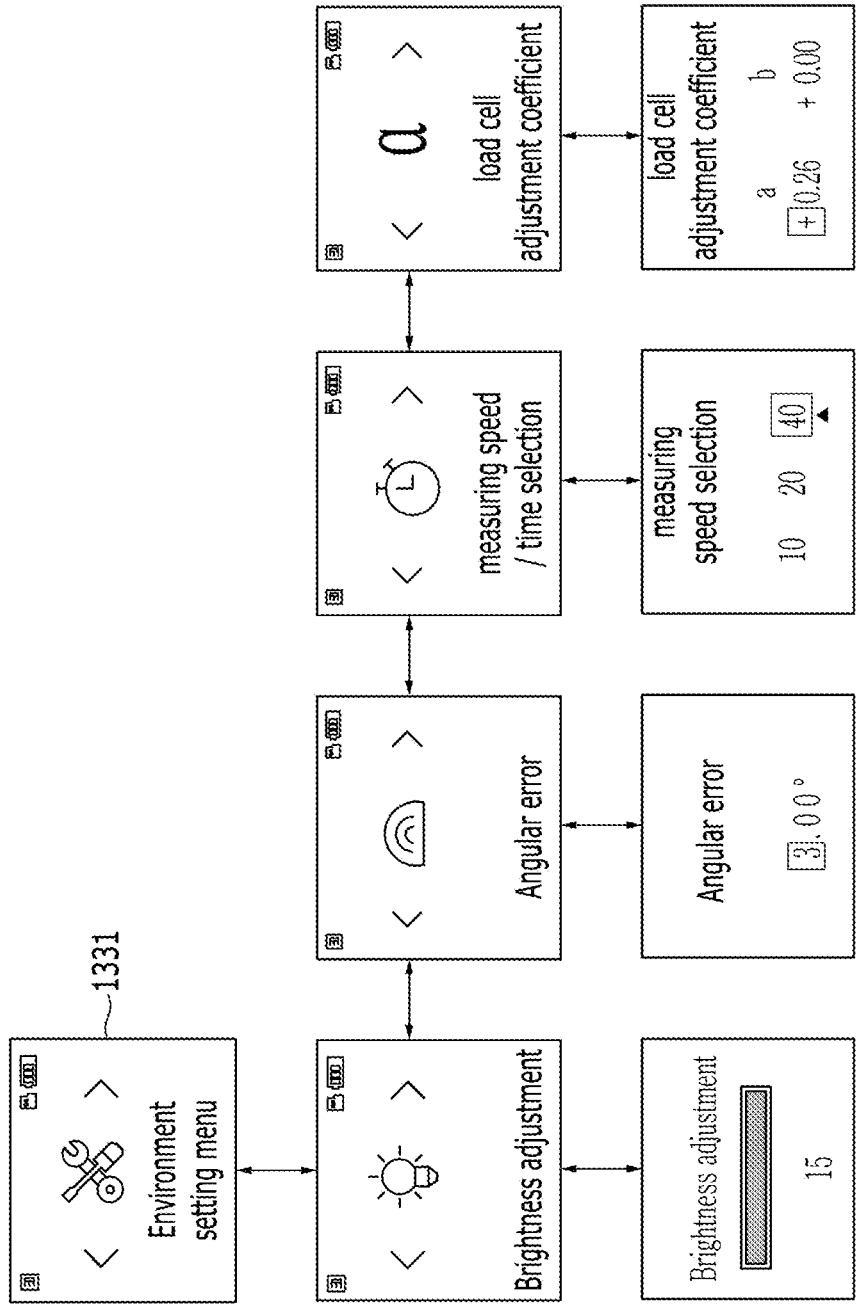
Figure 11:
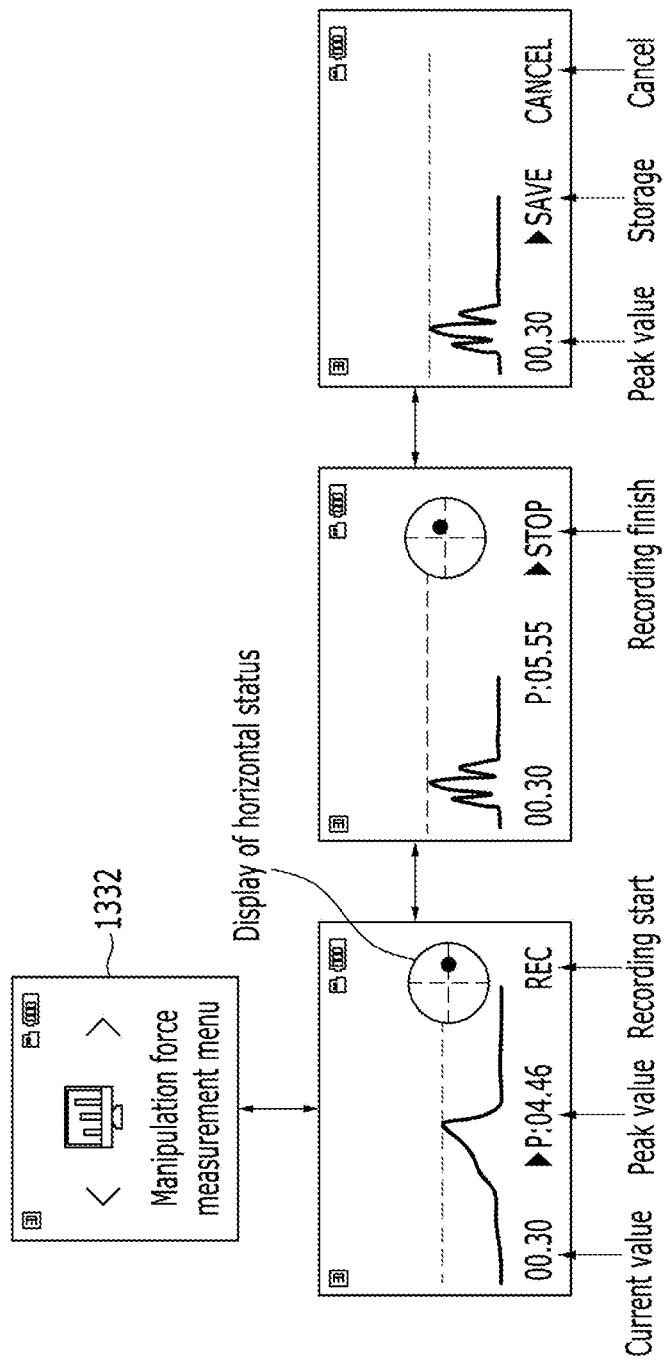

For example, FIG. 9 to FIG. 11 illustrate menu screens displayed on a display according to an exemplary embodiment.

Referring to FIG. 9, the display 133 may display a connected adapter and statuses of the storage and the battery, and also display a main menu including an environment setting menu 1331, a manipulation force measurement menu 1332, and a data transmission menu 1333, according to selection of the user.

Referring to FIG. 10, the environment setting menu 1331 may include sub-menus for setting parameter values for usage environment and measurement environment of the portable apparatus 100 for measuring a manipulation force.

For example, the environment setting menu 1331 may allow setting of parameters for, e.g., brightness adjustment, angular error (e.g., an angle corresponding to outermost of horizontal display, or an angular range), a measuring speed or time, and a load cell adjustment coefficient, and the like.

It may be understood that specific types and details of the parameters to be set by the environment setting menu 1331 may be designed by a person of ordinary skill in consideration of the parts to be manipulated in the vehicle, and embodiments of the present disclosure are not limited to the specific types and details.

Referring to FIG. 11, the manipulation force measurement menu 1332 may display the change in the manipulation force data measured in real time with a peak value and a graph.

The manipulation force measurement menu 1332 may be configured to display a horizontal status of the measurement apparatus obtained by a horizontal sensor and may set recording start and recording finish of the graph for the change in the manipulation force through the REC and STOP menus. In addition, sample data including time-dependent numerical data together with the graph are generated, a result of averaging and quantitative comparison on a plurality of accumulated sample data may be derived and displayed.

At this time, when the accumulation of sample data by a preset quantity is finished, an alarm may be made to the user, and the automatic measurement recording may be finished.

The accumulated sample data may be transmitted to the user terminal 10 through the data transmission menu 1333, for example by executing a file manager.

As shown in FIG. 1, the portable apparatus 100 for measuring a manipulation force may be mounted with the first manipulation force measuring device 110 and measure the change in the manipulation force in a vertical operation method of the push button 1 or an inner handle of a door (not shown) in the vehicle interior.

In addition, the portable apparatus 100 may be mounted with the second manipulation force measuring device 120 and measure the change in the manipulation force according to a sliding operation method of the manipulated part such as the wing node 2a of the air vent 2. In addition, by additionally employing the gripper 140, measure the change in the manipulation force according to a rotating operation method of the manipulated part such as the dial knobs 3 and 4.

As such, according to an exemplary embodiment, a portable apparatus for measuring a manipulation force is realized in a scheme replacing multi-function adapters to one measurement apparatus main body, and therefore, the apparatus becomes more portable, and capable of measuring the manipulation force of various manipulated parts in the second direction and the rotating direction as well as the back-and-forth direction.

The change in the manipulation force over time is obtained and displayed during the manipulation of the manipulated part, and quantitative comparison on the manipulated force may be enabled on the manipulation force data.

In addition, adapters with variously shaped tips appropriate for the manipulation directions and shapes of the manipulated component parts may be replaceably used, and thereby the accuracy in measuring the manipulation force may be improved, thereby reducing the time and cost for tuning the manipulation force.

It may be understood that the present disclosure is not limited to the specific embodiment, and various modification may be available.

For example, in the above specific example of the portable apparatus 100 for measuring a manipulation force of a manipulated part according to an exemplary embodiment, the first manipulation force measuring device 110 and the second manipulation force measuring device 120 may be selectively mounted on the measurement apparatus main body 130, depending on the type or the operation method of the manipulated part.

However, in the portable apparatus 100 for measuring a manipulation force of a manipulated part according to another exemplary embodiment, the manipulation force measurement unit including the first manipulation force measuring device 110 and the second manipulation force measuring device 120 may be integrally formed.

For example, referring to FIG. 8, the first manipulation force measuring device 110 and the second manipulation force measuring device 120 may be integrated into a housing of the manipulation force measurement unit, the first connector 1311 and the second connector 1321 may be connected to the connector terminal 1312 through a circuit connection.

In addition, depending on a mode selection of the input portion 136, selective one of the first manipulation force measuring device 110 and the second manipulation force measuring device 120 is operated, and the controller 138 may measure the change in the manipulation force over time, and display the measured change as a graph.

The exemplary embodiments of the present disclosure described above are not only implemented by the apparatus and the method but may be implemented by a program for realizing functions corresponding to the configuration of the embodiments of the present disclosure or a recording medium on which the program is recorded.

While this disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A portable apparatus for measuring a manipulation force, the portable apparatus comprising:
   a manipulation force measurement unit configured to measure a manipulation force applied on a manipulated part in a first direction of pushing forward or pulling backward and measure a manipulation force in a second direction of moving toward left or right; and
   a controller configured to process the measured manipulation force to generate manipulation force information over time,
   wherein the controller is configured in a measurement apparatus main body, and
   wherein the measurement apparatus main body is configured to selectively mount at least one of a first manipulation force measuring device configured to measure the manipulation force in the first direction and a second manipulation force measuring device configured to measure the manipulation force in the second direction;
   a mounting portion capable of mounting the manipulation force measurement unit and electrically connected to the mounted manipulation force measurement unit through a connector terminal; and
   a fastening bolt screw-engaged with a side surface of a main body housing of the measurement apparatus main body and configured to apply a fastening force to a side surface of the mounted manipulation force measurement unit toward the main body housing.

2. The portable apparatus of claim 1, wherein the first manipulation force measuring device comprises:

a first load cell configured to measure a force transferred in the first direction when pushing forward or pulling backward the manipulated part by a first measuring tip coupled to an end of a first rod;

a first connector having a multi-pin structure and configured to be electrically connected to a connector terminal configured in a mounting portion when mounted to the measurement apparatus main body; and a first adapter housing configured to install the first road cell and the first connector and being separable into upper and lower housings.

3. The portable apparatus of claim 2, wherein the first load cell is configured to measure the force directly transferred through the first rod and transmit a manipulation force signal corresponding to a measured force to the controller through the first connector.

4. The portable apparatus of claim 2, wherein the first adapter housing comprises a first insertion groove configured to receive a shaft of a fastening bolt configured on the mounting portion when mounted on the measurement apparatus main body.

5. The portable apparatus of claim 2, wherein the first measuring tip is replaceably mounted on the end of the first rod in accordance with a shape and an operation method of the manipulated part and is formed in at least one form of a hook shape, a concave triangular shape, a convex triangular shape, a conical shape, and a flat head nail shape.

6. The portable apparatus of claim 1, wherein the second manipulation force measuring device comprises:

a second load cell configured to measure force transferred in the second direction when moving the manipulated part to the left or right by a second measuring tip engaged to an end of a linkage portion perpendicularly connected to a second rod;

a second connector having a multi-pin structure and configured to be electrically connected to a connector terminal configured in a mounting portion when mounted to the measurement apparatus main body; and a second adapter housing configured to install the second road cell and the second connector and being separable into upper and lower housings.

7. The portable apparatus of claim 6, wherein the second load cell is installed in the second adapter housing in a direction perpendicular to the second measuring tip.

8. The portable apparatus of claim 6, wherein the linkage portion comprises:

a pin joint perpendicularly connected to the second rod;

a measurement shaft configured to mount the second measuring tip; and a hinge block configured to connect the pin joint and the measurement shaft through a hinge structure.

9. The portable apparatus of claim 8, wherein the pin joint is connected to the second rod through a ball joint bearing.

10. The portable apparatus of claim 8, wherein the second measuring tip forms a concave groove for positioning the manipulated part when measuring the manipulation force in the second direction.

11. A portable apparatus for measuring a manipulation force, the portable apparatus comprising:

a manipulation force measurement unit configured to measure a manipulation force applied on a manipulated part in a first direction of pushing forward or pulling backward and measure a manipulation force in a second direction of moving toward left or right a controller configured to process the measured manipulation force to generate manipulation force information over time; and a gripper configured to grip an exterior circumference of a rotation-type the manipulated part, wherein the controller is further configured to measure the manipulation torque of the rotation-type the manipulated part in a rotating direction.

12. The portable apparatus of claim 11, wherein the gripper comprises:

an adjuster configured to adjust a force for gripping a rotation-type manipulated part;

a threaded shaft coupled to a lower portion of the adjuster;

a base frame configured to support the lower portion of the threaded shaft;

a tong portion formed in a link structure and disposed on a circumference of the base frame;

a grip tip formed at an end of the tong portion; and a measurement bar horizontally extending from the base frame.

13. The portable apparatus of claim 12, wherein the controller is further configured to calculate a rotation manipulation torque by multiplying a radius of the rotation-type the manipulated part to a force of pushing the measurement bar and process the calculated torque to generate manipulation torque information over time.

14. The portable apparatus of claim 11, further comprising a measurement apparatus main body that comprises:

a signal processor configured to convert an analog manipulation torque signal received from the manipulation force measurement unit to a digital signal;

a storage configured to store a change in the manipulation torque collected by measurement for the manipulated part and a corresponding graph;

an input portion configured to be operated by a user for the manipulation torque measurement;

a power unit including a battery capable of charging and discharging and configured to supply an electrical power; and a display configured to display various menu for setting user environment and measurement conditions; and the controller further configured to operate the manipulation force measurement unit during a preset period according to an input from the input portion, measure the change in the manipulation torque while manipulating the manipulated part, and visually display a corresponding graph over time through the display.

15. A portable apparatus for measuring a manipulation force, the portable apparatus comprising:

a manipulation force measurement unit configured to measure a manipulation force applied on a manipulated part in a first direction of pushing forward or pulling backward and measure a manipulation force in a second direction of moving toward left or right;

a controller configured to process the measured manipulation force to generate manipulation force information over time; and a measurement apparatus main body that comprises:

a signal processor configured to convert an analog manipulation force signal received from the manipulation force measurement unit to a digital signal;

a storage configured to store a change in the manipulation force collected by measurement for the manipulated part;

an input portion configured to be operated by a user for the manipulation force measurement;

a power unit configured to supply an electrical power; and a display configured to display a menu for setting user environment and measurement conditions;

wherein the controller is further configured to operate the manipulation force measurement unit during a preset period according to an input from the input portion, measure the change in the manipulation force while manipulating the manipulated part, and visually display a corresponding graph over time through the display.

16. The portable apparatus of claim 15, wherein the measurement apparatus main body further comprises a communication unit configured to connected to a user terminal through wired or wireless communication to communicate the data stored in the storage.

17. The portable apparatus of claim 15, wherein the controller is further configured to calculate the change in the manipulation force over time under operation of the manipulated part based on the manipulation force signal processed at the signal processor and generate the graph for the time-dependent change.

18. The portable apparatus of claim 15, wherein the controller is further configured to generate time-dependent numerical data corresponding to the graph and display the generated data together with the graph through the display.

\* \* \* \* \*